No. 829,882. PATENTED AUG. 28, 1906.
E. A. MATHERS.
EXCAVATING MACHINE.
APPLICATION FILED DEC. 11, 1905.

3 SHEETS—SHEET 2.

Witnesses
F. L. Ormand.
M. W. Darg.

Inventor
Ezra A. Mathers,
E. W. Bradford.
Attorney

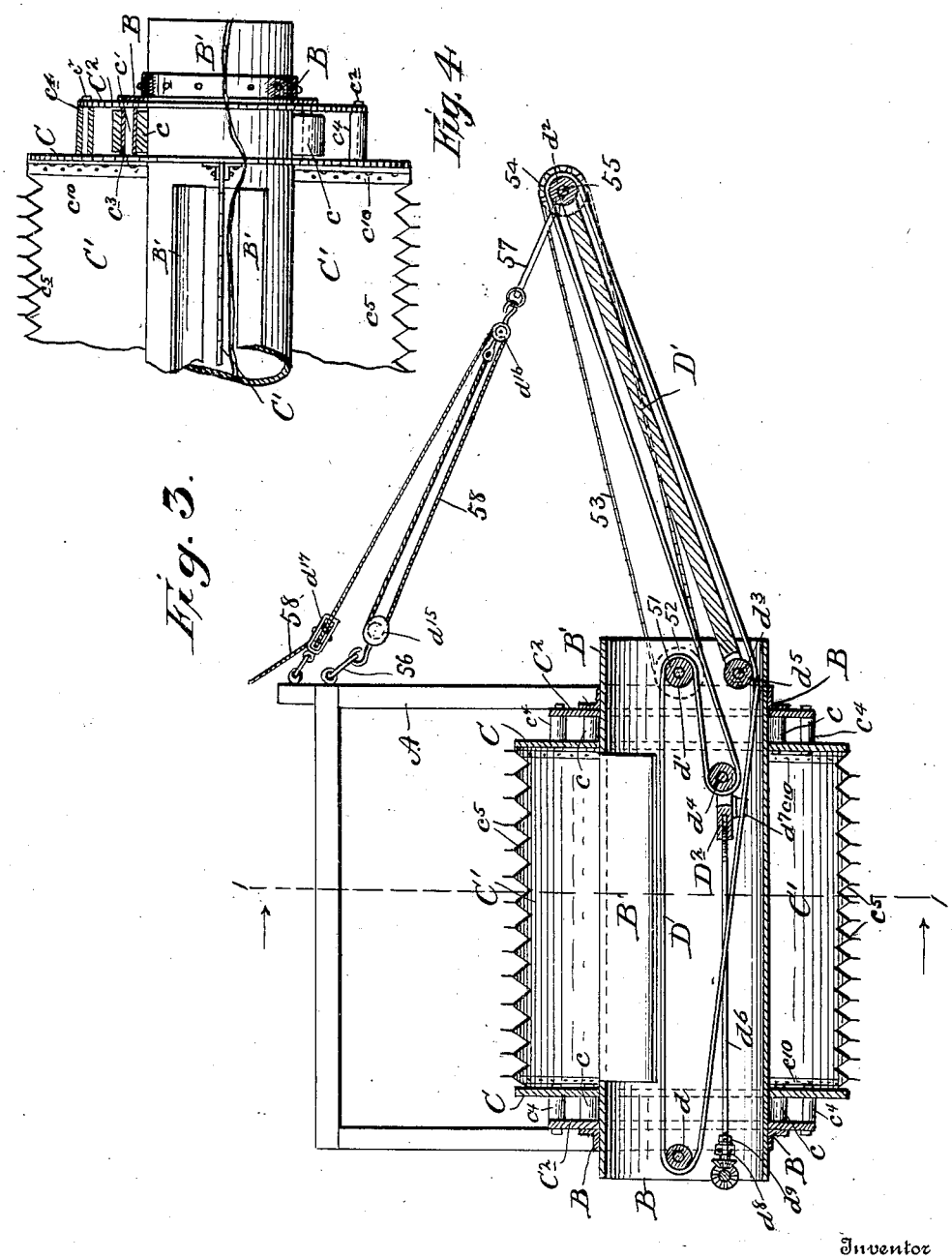

UNITED STATES PATENT OFFICE.

EZRA A. MATHERS, OF PHILADELPHIA, PENNSYLVANIA.

EXCAVATING-MACHINE.

No. 829,882.   Specification of Letters Patent.   Patented Aug. 28, 1906.

Application filed December 11, 1905. Serial No. 291,320.

*To all whom it may concern:*

Be it known that I, EZRA A. MATHERS, a citizen of the United States, residing at Philadelphia, in the county of Philadelphia and State of Pennsylvania, have invented certain new and useful Improvements in Excavating-Machines, of which the following is a specification.

My said invention consists in various improvements in the construction and arrangement of parts of excavating-machines of that class which are self-propelled and which carry the material excavated away from the machine and load it into a cart or conveyer to be carried away, whereby a very efficient and powerful machine in operation is provided as well as one comparatively simple and inexpensive to construct, all as will be hereinafter more fully described and claimed.

Figure 1:
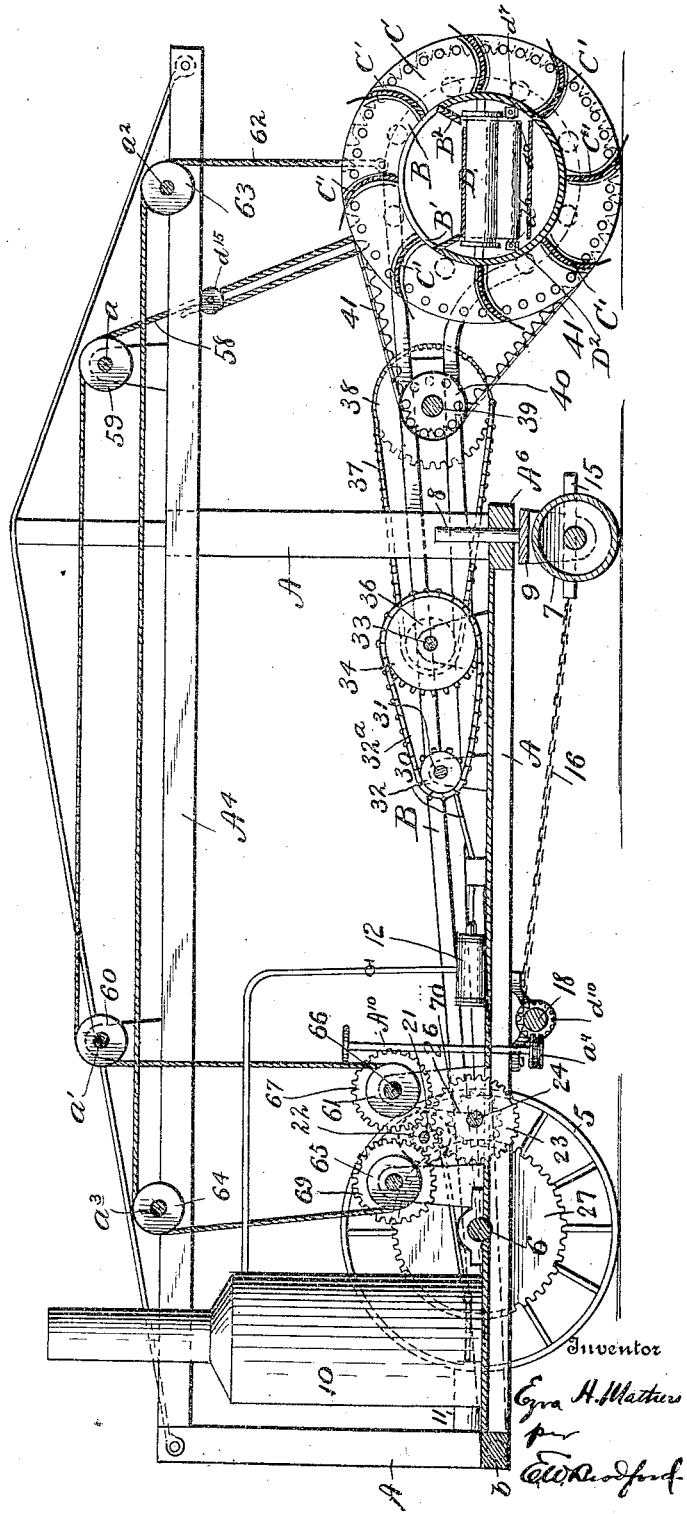
Figure 2:
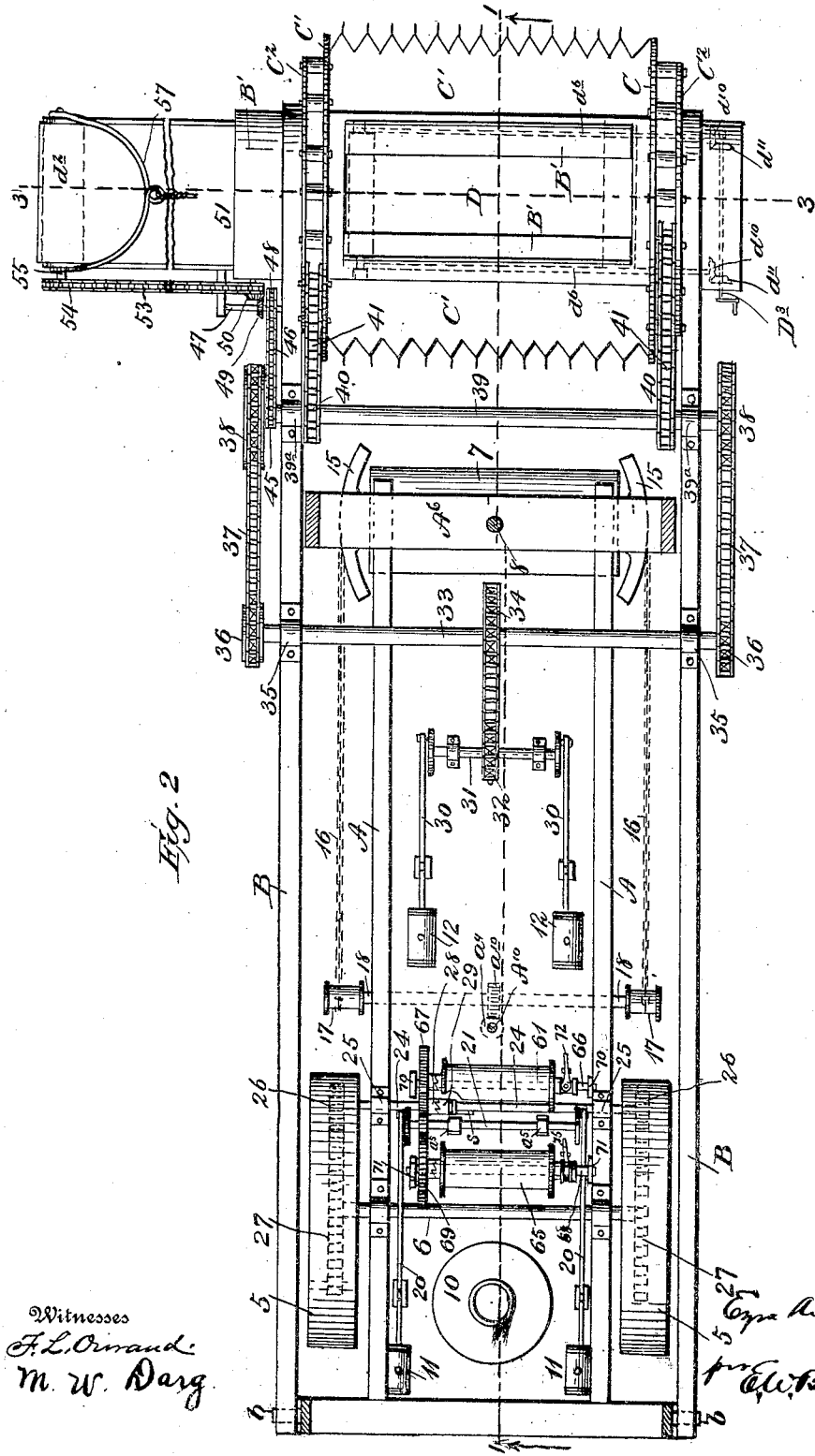

Referring to the accompanying drawings, which are made a part hereof, and on which similar reference characters indicate similar parts, Figure 1 is a longitudinal section through a machine of the character described as seen when looking in the direction indicated by the arrows from the dotted line 1 1 in Fig. 2; Fig. 2, a top or plan view of the same with the top of the frame or the derrick part cut off to show the mechanism on the bed more clearly; Fig. 3, a cross-section on the dotted line 3 3 in Fig. 2, and Fig. 4 a detail view showing the construction of one end of the digger on an enlarged scale.

In said drawings the portions marked A represent the frame of the machine; B, the frame carrying the rotary digger; C, said rotary digger, and D the conveyer. The main frame A comprises sills, standards, and flooring, suitable to afford supports for different parts and the various journal-bearings for the several shafts, &c. It is supported upon traction-wheels 5, mounted upon an axle 6 at its rear end, and upon a roller 7, journaled in a yoke 9, which is swiveled on an upright shaft 8, mounted in suitable bearings in a cross-sill of said frame A at its front end. A boiler 10 is mounted on the bed near its rear end which supplies steam to the engines 11 and 12, which are also mounted upon said bed or the floor of the machine. There is preferably a pair of the engines 11 and also of the engines 12, arranged on opposite sides of the structure, as will be presently described. Said forward roller 7 is mounted in the yoke-like frame 9, similarly to a common construction of traction-roller, and said frame 9 is provided with a segment 15 on each end, to the forward ends of which are attached the chains or other suitable flexible connections 16, which run in opposite directions over drums 17, mounted on opposite ends of a shaft 18, which is journaled in suitable bearings on the sills of the frame A. Said shaft 18 is provided with a spiral gear $a^{10}$, connected to a worm-gear $a^4$ on a steering-shaft $A^{13}$, or may be geared in any manner, so that it can be operated in either direction. When turned in one direction, it will turn roller 7 on pivot 8 to guide the machine one way, and when turned in the other direction will turn said roller to guide it the other way, as will be readily understood. The engines 11 are connected by the pitmen 20 with crank-pins on the ends of a crank-shaft 21, which is journaled in suitable bearings in the top of supports $a^5$, extending up from the bed of the machine. Said crank-shaft has a pinion 22 mounted thereon, which meshes with a gear-wheel 23 on a shaft 24, mounted in bearings 25 on the sills of frame A. Said shaft 24 extends out to within the flanges of traction-wheels 5 and has a gear 26 on each end, which meshes with a large gear 27, secured with each of said wheels 5 on the axle 6, thus providing the driving means for propelling said machines. Said gear-wheel 23 is mounted loosely on shaft 24 and has a clutch part 28 on its hub. Another clutch part 29 is mounted on said shaft 24 by means of a spline $s$ and is adapted to be thrown into and out of engagement with said clutch part 28 by a shifting-fork in the well-known manner. Thus when the machine is to be moved said clutch is engaged, and when it is to remain in a fixed position it is disengaged.

The arms B are preferably constructed of angle-iron, but may be of any suitable form, and are pivoted at their rear ends on pivots or journals $b$ on opposite ends of the rear sill of the frame A. Said arms extend forward to beyond the forward end of the frame A and surround opposite ends of a cylinder B', which cylinder is bolted or otherwise rigidly secured in the circular opening thus formed in the forward end of said arms. The top of said cylinder is cut away between said arms, forming an opening to receive the excavated material, as will be presently described. Its ends project through said arms to the outside thereof and furnish supports for the conveyer supporting and operating mechanism, as will also be presently described.

The rotary digger C comprises two annular heads mounted upon and adapted to rotate around the cylinder B', one near each end thereof, and having radial digger-blades C', arranged at intervals and supported between them by means of angle-irons $c^{10}$, riveted both to said heads and to said blades, as shown most plainly in Fig. 4. Said digger is supported on said cylinder B' by means of a series of antifriction-rollers $c$, mounted to rotate on bolts $c'$ between each head C and a ring $C^2$ set a short distance outside of said heads and held thereto by the said bolts $c'$ and bolts $c^2$, distance-sleeves $c^3$ and $c^4$ being mounted on said bolts to hold the heads C' and rings $C^2$ rigidly together and the proper distance apart. Said distance-sleeves $c^4$ are arranged at regular intervals near the outer edge of said rings $C^2$ and form lantern-wheels with which the sprocket-chains 41 engage to drive said digger. The digger-blades C' are preferably armed with pointed teeth $c^5$, of chilled steel, but may be of any special form or construction required by the particular work on which it is to be used.

The driving mechanism for the digger comprises the engines 12, connected by the pitmen 30 with a crank-pin on each end of the crank-shaft 31. Said crank-shaft 31 is provided with a sprocket 32, which is connected by a sprocket-chain $32^a$ with a sprocket 34 on the driving-shaft 33, which is mounted in suitable boxes 35 on the top edges of the arms B. Said shaft 33 is provided with a sprocket-wheel 36 on each end, which is connected by a sprocket-chain 37 to another sprocket-wheel 38 on each end of a counter-shaft 39, which is mounted in suitable boxes $39^a$ on said arms B at a distance from said shaft 33. Said shaft 39 has a lantern gear-wheel 40 near each end, which is connected by means of a sprocket-chain 41 with the lantern-gear formed around the outside of the ends of the rotary digger by the bolts $c^2$ and sleeves $c^4$, as before described. Said gearing is thus arranged to drive said rotary digger with great power and enable it to dig into hard and tough work with great ease and comparative speed.

The conveyer D is an endless belt mounted within the cylinder B' on suitable rollers $d$ and $d'$, journaled transversely near each end of said cylinder on shafts mounted in suitable bearings secured to the inside of said cylinder, and extends out through said cylinder to one side of the machine and is supported at its outer end upon a roller $d^2$, mounted on a shaft 55, journaled in bearings on the outer end of a transversely-extending supporting arm or frame D'. Said arm D' is pivoted at its inner end upon a transverse pivot-rod or shaft $d^3$, which extends transversely from one side to the other in the end of cylinder B' near its lower side. Said conveyer D is an endless belt, as shown most clearly in Fig. 3, and extends over said rollers $d$ and $d'$ within the cylinder B', then back and under an idler-roller $d^4$, which is mounted upon a shaft carried on an adjustable yoke $D^2$, then from the under side of said idler $d^4$ out over the transversely-extending frame D' and over the roller $d^2$ on its outer end, then back under said frame D' and under an idler $d^5$, mounted upon the pivot-rod $d^3$, and back to the roller $d$. The adjustable yoke or frame $D^2$ is mounted to slide on suitable supporting-brackets $d^7$, secured on the sides of the cylinder and has screw-threaded perforations engaged by screw-rods $d^6$, which are mounted in boxes $d^8$ and secured from longitudinal movement by a collar $d^9$ on one side thereof and by the spur gear-wheels $d^{10}$ on the other side, which spur-gears mesh with similar gears $d^{11}$ on a transverse crank-shaft $D^3$, by which said rods may be turned back and forth to adjust said frame $D^2$ to tighten or loosen said conveyer-belt as desired. Guide-boards $B^2$ extend from each edge of the opening in cylinder B' down to the top of the conveyer, as most clearly shown in Fig. 1, to guide the material onto said conveyer and prevent it from being deposited in the bottom of said cylinder. Said conveyer is driven by means of a sprocket-wheel 45 adjacent to the sprocket-wheel 38 on shaft 46 to a sprocket-wheel 48 on a shaft 47, journaled in bearings on the sides of frame B. A miter-gear 49 on said shaft 47 engages with a similar gear 50 on the outer end of shaft 51, on which the rollers $d'$ is mounted. Said shaft 51 has a sprocket-wheel 52 mounted thereon, and a sprocket-chain 53 runs therefrom to a sprocket-wheel 54 on one end of shaft 55, on which roller $d^2$ is mounted at the outer end of the pivoted frame D'.

The outer end of the pivoted frame D' is supported by means of a block and tackle, one block $d^{15}$ of which is connected to a ring 56 on the side of one of the uprights of frame A, and the other block $d^{16}$ of which is connected to a ring on a bail 57, mounted on the ends of the shaft 55 at the outer end of said frame D'. The end of the rope 58 passes back over a sheave in a third block $d^{17}$, also connected to the frame A, and passes back over sheaves 59 and 60 on shafts $a$ and $a'$, supported on the top timber $A^4$ of said frame, and passes down and is connected to a winding-drum 61. The outer or forward end of the pivoted frame B, carrying the rotary digger and operating mechanism, is supported by means of a cable 62, which passes up over a sheave 63 on a shaft $a^2$ on the timber $A^4$ and back to near the rear end of the machine, where it passes down over another sheave 64 on a shaft $a^3$ and is connected to a winding-drum 65. The winding-drum 61 is mounted on a shaft 66, journaled in standards 70, extending up from the bed of the machine, and has a gear-wheel 67, which meshes with the gear-wheel 22 on shaft 21. The winding-drum 65 is mounted on a shaft 68, journaled in standards 71, and has a gear-wheel 69, which meshes with pinion 22 on shaft 21. Said drums are thus geared to be driven by the engines 11 through the train of gearing described. Each of said drums 61 and 65 is mounted loosely on its shaft and has a clutch part on its end adapted to engage with a clutch part on the hub of the respective gear-wheels 67 and 69, said drums being, respectively, engaged by shifting-forks 72 and 73 at their other ends, by which they may be slid on their respective shafts to engage with the gear-wheels when desired. They are held from turning to unwind the cables by suitable rack and pawl engagements, as usual in derrick construction and as will be readily understood. By this means the outer end of frame B may be raised and lowered to the proper position, and the outer end of the conveyer-frame D' may be raised and lowered to deposit the material at whatever elevation is desired by the engines, the proper clutch being engaged to operate the appropriate drum as above described.

Having thus fully described my said invention, what I claim as new, and desire to secure by Letters Patent, is—

1. An excavating-machine comprising a main frame mounted upon traction-wheels and having a rotary digger supported thereon upon a pivoted frame, said pivoted frame carrying said rotary digger and the mechanism for conveying the material away from the machine, and means for operating said digger and raising and lowering said frame, substantially as set forth.

2. In an excavating-machine, the combination of the frame, mounted upon wheels, a rotary digger carried by arms, said arms pivoted to said frame, means for adjusting and supporting said pivoted arms at the desired elevation, means for operating said digger, and a conveyer, mounted within said digger and carried by the same pivoted arms, substantially as set forth.

3. In an excavating-machine, the combination of the main frame, a pair of pivoted arms pivoted thereto at their rear ends and having a hollow cylinder rigidly secured to their outer ends, said cylinder being formed with an opening in its top, a rotary digger mounted to rotate upon said cylinder and deposit the material through said opening, a conveyer mounted within said cylinder and arranged to receive said material and carry it away from the machine, and mechanism for operating said several parts, substantially as set forth.

4. In an excavating-machine, the combination, of the frame, the pivoted frame mounted thereon, a hollow cylinder carried on the outer end of said pivoted frame, a rotary digger mounted upon said cylinder, which cylinder has an opening in its top and which digger is arranged to deposit the material through said opening, a conveyer within said cylinder, and means for operating said parts, substantially as set forth.

5. An excavating-machine, comprising a rotary digger formed of annular heads with radially-extending digger-blades between them mounted upon a hollow cylinder, said cylinder provided with an opening in its top, said digger being arranged to deposit the material through said opening, a conveyer within said cylinder, and means for operating said several parts, substantially as set forth.

6. In an excavating-machine, the combination, of the main frame, a pivoted frame, the hollow cylinder mounted in said pivoted frame and formed with an opening, a rotary digger comprising annular heads with digger-blades secured between them and having antifriction-rollers mounted thereon, said rotary digger being mounted on said hollow cylinder with said rollers resting on its surface, and means for operating said parts, substantially as set forth.

7. An excavating-machine, comprising a main frame supporting the driving mechanism, a pivoted frame mounted on said main frame having a hollow cylindrical bearing on its outer end formed with an opening in its top, a conveyer within said bearing, a rotary digger mounted on said bearing, and the driving mechanism, substantially as set forth.

8. In an excavating-machine, the combination, of the main frame, the vertically-adjustable frame carried thereby and having a hollow cylindrical bearing at its outer end with an opening in its top, a conveyer in said bearing, a rotary digger comprising annular heads having digger-blades secured between them, said heads being mounted to rotate upon said bearing, and means for driving said several parts, substantially as set forth.

In witness whereof I have hereunto set my hand and seal, at Washington, District of Columbia, this 13th day of November, A. D. 1905.

EZRA A. MATHERS. [L. S.]

Witnesses:
E. W. BRADFORD,
CHAS. E. RIORDON.